US012513196B2

(12) United States Patent
Deshpande et al.

(10) Patent No.: US 12,513,196 B2
(45) Date of Patent: Dec. 30, 2025

(54) DYNAMIC CONTENT SECURITY POLICIES USING WEBPAGE DATA LOADED IN WEBPAGE ELEMENT PROXIES

(71) Applicant: PAYPAL, INC., San Jose, CA (US)

(72) Inventors: Walmik Waman Deshpande, Pasadena, CA (US); Venkatesan Duraikannu, Santa Clara, CA (US); Zee Alice Abrahams, Bellingham, WA (US); Ezekiel John Keator, Saginaw, TX (US)

(73) Assignee: PAYPAL, INC., San Jose, CA (US)

(*) Notice: Subject to any disclaimer, the term of this patent is extended or adjusted under 35 U.S.C. 154(b) by 197 days.

(21) Appl. No.: 18/461,161

(22) Filed: Sep. 5, 2023

(65) Prior Publication Data

US 2025/0080584 A1    Mar. 6, 2025

(51) Int. Cl.
*H04L 9/40*    (2022.01)
(52) U.S. Cl.
CPC .......... *H04L 63/20* (2013.01); *H04L 63/0281* (2013.01); *H04L 63/10* (2013.01)
(58) Field of Classification Search
CPC ..... H04L 63/20; H04L 63/0281; H04L 63/10; H04L 63/0807
See application file for complete search history.

(56) References Cited

U.S. PATENT DOCUMENTS

| | | | | |
|---|---|---|---|---|
| 9,251,372 B1* | 2/2016 | Lahoz | ................. | G06F 21/6245 |
| 12,254,474 B1* | 3/2025 | Naamneh | ............ | H04L 63/1466 |
| 2006/0253582 A1 | 11/2006 | Dixon et al. | | |
| 2010/0094755 A1* | 4/2010 | Kloster | .................. | G06Q 30/04 |
| | | | | 705/44 |
| 2013/0036476 A1* | 2/2013 | Roever | ............... | G06F 21/6218 |
| | | | | 726/27 |
| 2018/0109540 A1* | 4/2018 | Amar | .................. | H04L 63/0876 |
| 2021/0065185 A1 | 3/2021 | Krishnanand et al. | | |
| 2021/0326818 A1 | 10/2021 | Hogg | | |
| 2022/0417233 A1* | 12/2022 | Singhal | ............... | H04L 63/0807 |
| 2023/0029913 A1 | 2/2023 | Mukherjee et al. | | |
| 2023/0137417 A1 | 5/2023 | Tiwari | | |

OTHER PUBLICATIONS

International Search Report and Written Opinion for Application No. PCT/US 24/42808, Nov. 21, 2024, 13 pages.

* cited by examiner

*Primary Examiner* — El Hadji M Sall
(74) *Attorney, Agent, or Firm* — Haynes and Boone, LLP

(57) ABSTRACT

There are provided systems and methods for dynamic content security policies using webpage data loaded in webpage element proxies. A service provider may provide online digital computing services, such as electronic transaction processing, account, and the like through online platforms and digital content that may be loaded and served on external webpages. To secure such computing services, webpage data, and digital content from misuse, fraud, or abuse, the service provider may utilize and implement a set of utilities that provide dynamic and secure gateways to internal and/or hosted webpages, webpage content and data, or other digital content of the service provider on external third-party domains, such as websites of known or unknown third parties. This may be done through an iframe or proxy that allows for loading of the digital content on the third-party domain. Access tokens may establish allowable domains for loading the digital content.

20 Claims, 6 Drawing Sheets

DYNAMIC CONTENT SECURITY POLICIES USING WEBPAGE DATA LOADED IN WEBPAGE ELEMENT PROXIES

TECHNICAL FIELD

The present application generally relates to digital content security and more particularly to providing dynamic content security policies to manage webpage data and other digital content loaded on external webpages using webpage element proxies.

BACKGROUND

An online service may provide services to users that may be associated with online shopping and transaction processing, such as electronic transaction processing on or through merchant websites and digital marketplaces. These service providers may attempt to make their products and services seamlessly available to merchants and through their merchant websites, but may be faced with multiple challenges. For example, the service provider may be required to open up computing service endpoints to external third-party domains and websites, which introduces risk of computing attacks and malicious conduct by untrustworthy, malicious, or fraudulently acting third parties. For the internal service endpoints to be opened up and accessible, the service provider may be required to bypass or reconfigure information security (infosec) rules, such as service control policies (SCPs) to allow requests, which is undesirable and introduces risk of computing threats and attacks. As such, bypassing of rules may heavily compromise security, which may also impact seamless provision of computing services. The service provider may alternatively institute a process to provide exceptions, but this would require individual and manual review, as well as slow, complex, and laborious configuring of rules and exceptions. Thus, it would be difficult for the service provider to react to merchant needs with the rapidity required to reach intended service provision and goals. As such, current platform capabilities are not capable of overcoming this dilemma. Thus, it is desirable for online transaction processors to implement security policies in a manner that is dynamic and secure when providing webpage data or other digital content on external third-party websites.

Figure 1:
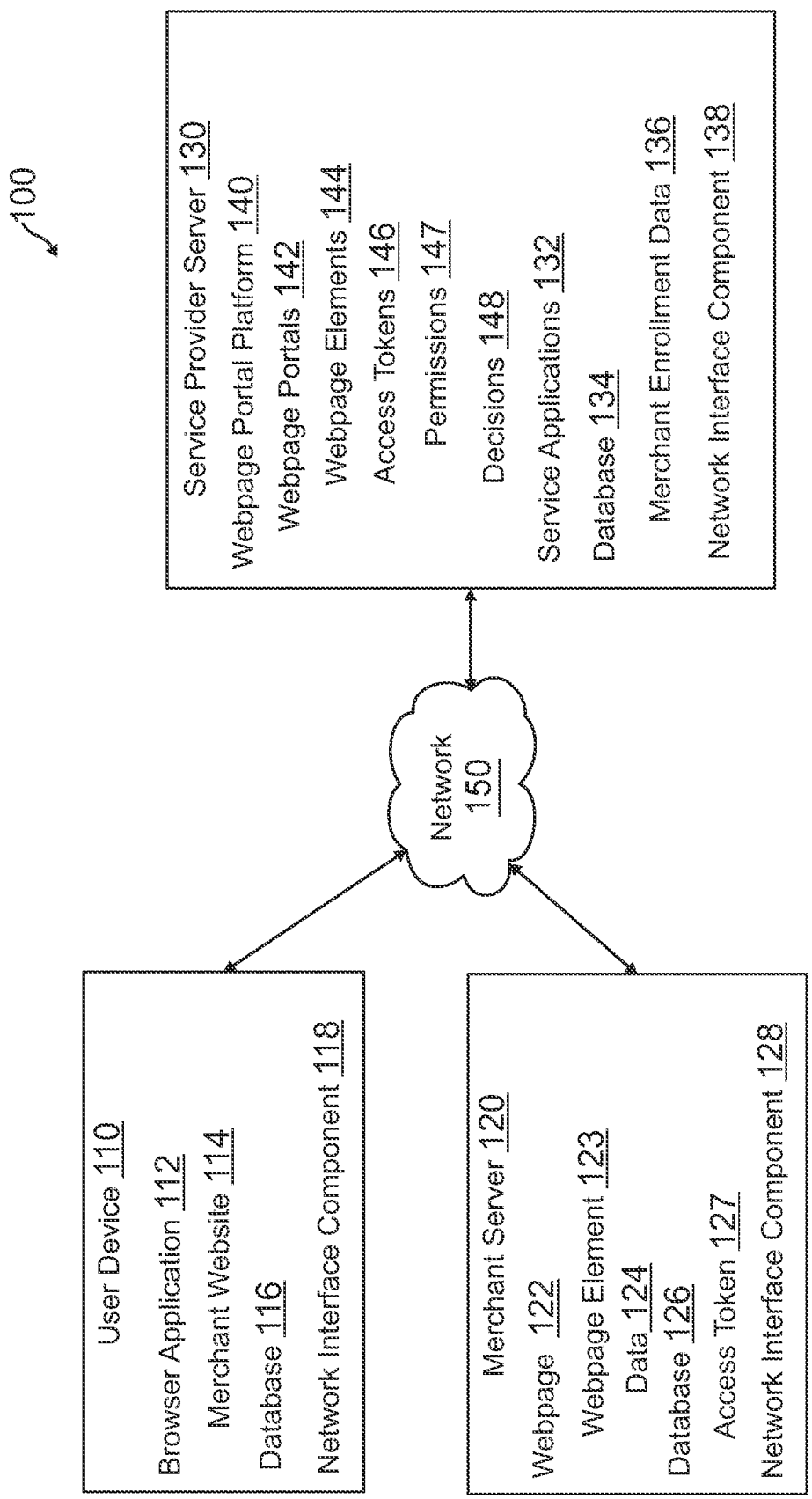
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for providing and managing dynamic content security policies using webpage data loaded in webpage element proxies. Systems suitable for practicing methods of the present disclosure are also provided.

An online service provider may provide computing services, tools, and operations utilized when checking out and paying for transactions electronically on merchant websites, such as computing services, applications, webpages, and infrastructure for electronic transaction processing. Such service providers may also or instead provide other computing services, such as those associated with social networking, microblogging, media sharing, messaging, business and consumer platforms, etc. In this regard, the service provider may provide webpages, online resources, and digital content to facilitate provision of these computing services, such as those webpages, online resources, and digital content hosted and/or provided by an online transaction processor (e.g., PAYPAL®, VENMO®, etc.). In order to process these transactions, a merchant may provide the computing services of the online transaction processor through the merchant's websites and/or applications, where a user may utilize a payment card, account, and/or digital wallet to process payments through a payment network provided and/or utilized by an online transaction processor. A digital account of the user with the online transaction processor (e.g., PAYPAL®, VENMO®, etc.) may provide electronic transaction processing services to users on one or more merchant websites in this manner.

However, in order to provide computing services on merchant websites, the service provider may be required to provide access to and usage of internal endpoints for computing systems to facilitate processing of user interactions with webpages (e.g., electronic transaction processing requests), which introduces vulnerabilities. To solve this problem with conventional computing architectures and technology, the service provider may implement a solution using webpage proxies and other webpage elements, such as iframes, that may act as proxies to load data on external third-party webpages of the merchants. This may be done through injecting, placing, or implementing the webpage proxies or iframes on merchant webpages through software development kits (SDKs) and corresponding computing code, code snippets or packages, and/or executable operations provided by the service provider to merchants. When implementing, the merchant may establish one or more access tokens granting permissions or establishing allowable webpages of the merchant that are designated and trusted for loading of the service provider's webpages and connectivity to internal endpoints for data processing. These permissions may be set as content security policies (CSPs), but may be established to be dynamic and changeable by changing the permissions for trusted or valid webpages. Thus, when a call is made from a website to the service provider to load a webpage, webpage data and/or rendering or presenting data for a webpage, and/or other digital content, the service provide may implement a security policy and/or reviews to only allow provision and/or loading of such data to allowed websites and merchants or other third parties. The iframe may allow computing code to execute a call and/or navigation to a domain associated with the service provider for an internal endpoint and request webpage data or other digital content. Once called, the domain may allow the service provider to determine if permission has been granted and what the permission is (e.g., length of time, selected or all webpages of the website, allowed functionalities, and the like). The service provider may therefore determine the permissions for the merchant's or other third party's website or application, which allows for dynamic provision and rending of content. This allows the online transaction processor or other service provider to implement a dynamic security policy that is changeable, dynamic, and secure through access token data and iframe-based or other webpage element-based proxy usage for data loading.

For example, a user may wish to process a purchase of one or more items in a transaction. Selection of one or more items during an online transaction with a merchant website may require a payment instrument from the user for electronic transaction processing. A user may pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items. However, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. In this regard, the transaction processor or other online service provider may offer and provide computing services and access to internal endpoints for such services to merchants for electronic transaction processing and/or other use of computing services on websites, applications, or other online portals of the merchant. The transaction processor may provide one or more application programming interfaces (APIs), calls and call structures, integrations, and the like between different applications, microservices, decision services, and/or digital platforms of the transaction processor's system. The API integrations may allow for API calls and requests to be executed to track, request, and/or receive data from different platforms and operations of those platforms with merchant websites.

As such, merchants may desire to host and provide webpages of the transaction processor or other service provider through websites and applications provided by the merchant. However, by generally opening up access to these services and endpoints, the online service provider may introduce risk to their computing infrastructure and/or fraud to their transaction processing.

To address this problem, in some embodiments, the online service provider may first establish an access token or other digital tokenization data (e.g., a universal access token, or UAT), which may be used to uniquely identify the merchant and provide merchant identification, verification, and/or trust when received by the service provider. Thus, the merchant may establish a UAT or other access token, such as prior to, during, or after onboarding with the service provider for use of the desired computing services, account, or the like, as well as when configuring merchant websites, applications, and systems to interface with, utilize, and integrate with the service provider's computing architecture. The access token may be initialized and generated during an iframe-based proxy request or usage of an iframe or other webpage element-based proxy that requests webpage data from the service provider. The iframe or other proxy may request or provide data for an access token, which the service provider may then verify and set the merchant's website uniform resource locator (URL) or other network address or identifier as the proxy's parent or ancestor for a trust relationship that verifies requests when the token is received from the URL, address, or identifier and designated as being used in conjunction with such identifier. This allows the permissions for the token to be established with the particular identifier corresponding to the trusted merchant website, application, endpoint, or other network or system location and/or component for a trust relationship.

Prior to, during, or after this tokenization and trust establishment process, the merchant may also establish an account with the service provider, such as in a similar manner to a user account but designated for the merchant to receive payments from users or other entities, provide payment or outgoing funds, and/or otherwise engage in electronic transaction processing in the course of the merchant's business. The merchant may further utilize an SDK or other data packages, instructions, and/or components to setup the iframe, webpage element, or other proxy within the merchant's website and/or computing infrastructure so that the proxy may be used for checkout, payment processing or usage of other computing services of the service provider. Such usage of services may be performed through the proxy, and as such, the SDK may provide code snippets, packages, coding and/or integration instructions (e.g., endpoint identification and addresses, implementation instruction, etc.) to the merchant. The merchant may therefore use the SDK to configure their internal system, website, and/or application as a third-party platform hosting and providing the service provider's computing functionalities through the proxy. The SDK may provide code, code snippets, instructions, API specifications, application packages, and the like to implement iframes and/or other iframe-based proxies as webpage elements on webpages. An iframe that is injected or established on a merchant website may link to the service provider for loading of data. An iframe or inline frame may correspond to a hypertext markup language (HTML) document that is embedded in another HTML document, such as the webpage that the web browser application lands on and is displayed. Iframes may be used to insert content from another source or webpage into a displayed webpage. When a user navigates to the merchant website, the website may make a request to the service provider to load within the iframe, such as webpage data for a payment processing, account login, and/or another webpage of the service provider. Thus, the iframe may make a call to a server of the service provider for such data.

The service provider may then receive this call and determine an authorization for the requesting website, application, or the like. Once installed on the merchant's website, application, and/or system, the iframe-based proxy may provide features to make network calls to the host, servers, and/or webpage(s) of the service provider from non-service provider domains, such as external third-party websites and domains. This proxy may use an iframe or other webpage element to load a webpage and/or webpage data from the service provider, and provide a "Fetch"-like API to make network calls to the service provider. A Fetch-like API may correspond to an interface for fetching resources over a network, which may use request and response objects to identify a path to a resource to be fetched and request the resource. This may return a "promise" object, which may correspond to an object that represents the eventual completion or failure to complete of an asynchronous operation to fetch the resource, as well as the resulting value of that fetch operation. The promise object may service as a proxy for a value until resolution of the completion/failure of the fetch operation. Thus, the Fetch-like API may utilize similar operations to resolve a response to the request and handle retrieved content.

In this regard, the service provider may provide the Fetch-like API that appears as "fetch" or Fetch objects. However, in the backend computing environment, the service provider and system for proxy usage through this portal may orchestrate actual fetches of resources via post messages to the iframe or other proxy. This may retain a similar interface to Fetch, which allows compatibility with the proxy and merchant systems. When the proxy makes a command via the Fetch-like API (e.g., a fetch object or command), an access token may also be sent and/or requested and received by the service provider's system and/or endpoints for authorization of the fetch for a resource (e.g., internal endpoint for a computing service) of the service provider. This may include receiving the access token by the service provider and identifying a network address sending the request and/or making the call and fetch to the service provider (e.g., by an incoming URL or network address). A database lookup for authorizations may be performed to determine authorized network addresses for the access token and whether a response to the fetch call, command, and/or object may include the requested webpage and/or webpage data.

In this regard, when using the Fetch-like API, "postMessage" processes may only be capable of returning "undefined." To adhere to a Fetch-like behavior, the proxy may create a custom "deferred promise" object similar to the aforementioned promise object, and a corresponding derived resolve and reject process may be injected to an array corresponding to the fetch object and stored on the iframe object. This may send an index of each inserted deferred promise object to the iframe or other proxy. The proxy may perform a fetch and respond back with a data object, container, or the like, such as a JavaScript Object Notation (JSON) object, with an associated index via a postMessage to a listener associated with the proxy that listens for the post message. Once this happens, the proxy may use the incoming JSON response to create a new response object (as postMessages may only operate with strings and serialized JSON), which may be used with the index to resolve/reject the correct promise that is being awaited.

However, since the proxy may load an internal endpoint of the service provider and then perform network requests using the proxy, a fraudster may load the same endpoint within an iframe and start making calls to the service provider from their own website. To circumvent this scenario and other computing attacks, the proxy endpoint may utilize the aforementioned access token and permission lookup for a dynamic CSP set for the merchant and/or access token, which has an entry for the URLs or other network address that have permissions set by the merchant and service provider so that the merchant can serve their experience from and/or in conjunction with such network addresses. The incoming signature for the token may be verified using a public key, and the merchant URL or other address with the network address for the token are verified to prevent loading the proxy endpoint on a non-intended domain. This allows for a dynamic CSPs and CSP management, where permissions with the token may be updated without generating specific rules and/or permissions for certain merchants.

As such, merchants may manage their permissions, and service providers may quickly review and change or update permissions as needed and to prevent fraud while providing merchants flexible content security policy updates. In this regard, the iframe injected and/or embedded to the webpage of the merchant by the service provider may be used to point to and/or open another domain or webpage of the service provider that loads content associated with the granted permission. The iframe may call a server of the service provider to load webpage content from a different domain, which may be allowed when the service provider's server determines a permission for network addresses associated with the access token. Thus, a service provider may provide for endpoint and computing service integrations and interoperability with different external third-party websites in a coordinated manner, with improved security and fraud prevention. This may be done in an automated manner to provide faster and more secure webpage and content loading in website proxies. These features further provide a dynamic content security policy that may be quickly and efficiently changed to meet changing requirements by merchants and other entities.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110, a merchant server 120, and a service provider server 130 in communication over a network 150. User device 110 may be used to browse items on websites, such as those provided by merchant server 120, and thereafter generate transactions and/or process payments. Payments and electronic transaction processing may be facilitated through a payment platform, application, and/or application extension using digital accounts and processing operations of service provider server 130. User device 110 may be used to access the merchant's website provided by merchant server 120, which may request to serve data from an endpoint of service provider server 130 through an iframe-based proxy or other webpage element serving as a proxy for the endpoint's data. Thus, service provider server 130 may interact with the merchant website and/or request to provide such data based on the operations discussed herein.

User device 110, merchant server 120, service provider server 130 may each include or be executed using one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with service provider server 130 and/or websites corresponding to and provided by merchant server 120, such as for browsing data, processing payments and transactions, and the like. User device 110 may correspond to an individual user, consumer, or entity that processes payments through webpages and electronic transaction processing services provided by service provider server 130. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains browser application 112, a database 116, and a network interface component 118. Browser application 112 may correspond to executable processes, procedures, and/or applications with associated hardware. In other embodiments, user device 110 may include additional or different software as required.

Browser application 112 may correspond to one or more processes to execute modules and associated devices of user device 110 to provide a convenient interface to permit a user for user device 110 to view content provided via merchant server 120 including merchant website 114 hosted and/or provided by merchant server 120, where the user may enter, view, and/or process items the user wishes to purchase in a transaction. In this regard, browser application 112 may correspond to specialized hardware and/or software utilized by user device 110 that may provide for website and item browsing, as well as transaction processing for the items. Viewing, browsing, and interacting with merchant server 120 may be done through one or more user interfaces of browser application 112 enabling the user to access merchant server 120 and enter and/or view the items that the user associated with user device 110 wishes to purchase on merchant website 114. This may be based on a transaction generated by browser application 112 using a merchant website provided by merchant server 120. Browser application 112 may also be used by a user to provide payments and transfers to the merchant, such as using electronic transaction processing provided through computing services on service provider server 130 on merchant website 114.

For example, browser application 112 may utilize user financial information, such as credit card data, bank account data, or other funding source data, as a payment instrument when providing payment information. Additionally, browser application 112 may utilize a digital wallet associated with an account with service provider server 130 as the payment instrument, for example, through accessing a digital wallet or account of a user through entry of authentication credentials and/or by providing a data token that allows for processing using the account. Data for electronic transaction processing, login and authentication, payment and shipping, and the like may be provided to webpage data and/or other digital content provided to browser application 112 on merchant website 114 from service provider server 130. This may be done using iframe-based or similar proxies or other operations to host or provide links, inline content, and the like on third-party websites and applications. Browser application 112 may also be used to receive a receipt or other information based on transaction processing.

In various embodiments, browser application 112 may correspond to a general web browser application configured to retrieve, present, and communicate information over the Internet (e.g., utilize resources on the World Wide Web) or a private network. For example, browser application 112 may provide a web browser, which may send and receive information over network 150, including retrieving website information, presenting the website information to the user, and/or communicating information to the website, including payment information for the transaction. Browser application 112 may correspond to a mobile web browser application, such as one provided on mobile smart phones including SAFARI® on iOS, Google CHROME®, and the like. Browser application 112 may therefore load content in a browser with corresponding data navigation and input features and components from merchant server 120 for merchant website 114, as well as view and interact with additional webpage data and digital content provided through merchant website 114 from an endpoint of service provider server 130 (e.g., for account login, electronic transaction processing, and the like).

User device 110 may further include database 116 which may include, for example, identifiers such as operating system registry entries, cookies associated with browser application 112 and/or other applications, identifiers associated with hardware of user device 110, or other appropriate identifiers. Identifiers in database 116 may be used by a payment/service provider to associate user device 110 with a particular account maintained by the payment/service provider. Database 116 may also further store received transaction data, as well as processed transaction data. In various embodiments, data associated with webpage browsing and content from webpages may be stored by database 116, such as the aforementioned cookies, browsing history, and the like.

User device 110 includes at least one network interface component 118 adapted to communicate with merchant server 120, service provider server 130, and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant server 120 may be maintained, for example, by a merchant or other entity that provides items for sale to users. Merchant server 120 may correspond to one or more online merchant marketplaces, sales platforms, websites, applications, and/or online resources where a user may browse online digital content, webpages, data in application interfaces, and the like for shopping and purchasing items. For example, merchant server 120 may correspond to one or more websites and/or applications having accessible online digital platforms where a user may be offered products, services, and other items for sale and users may browse items, select items for purchase, and engage in electronic transaction processing. Merchant server 120 may further include other platforms, websites, and resources that may allow users to engage in electronic transaction processing through computing services provided by service provider server 130, such as those associated with payment processors, transfers of funds, and other payment of a balance due for some product, service, or other item. In some embodiments, merchant server 120 may be implemented as a single or networked personal computers (PCs), servers, and/or other types of computing devices. Although only one merchant server is shown, a plurality of merchant servers may function similarly.

Merchant server 120 of FIG. 1 contains a merchant webpage, a database 126, and a network interface component 128. Merchant webpage 122 may correspond to executable processes, procedures, and/or applications with associated hardware. In other embodiments, merchant server 120 may include additional or different software as required.

Merchant webpage 122 may provide and/or process items for sale with user device 110 and/or a user associated with user device 110 (e.g., payment sources including a payment card, digital account, cash, etc.). In certain embodiments, merchant website 114 may be accessible over the Internet and provide for sales with user device 110 over network 150. Merchant webpage 122 may correspond to an online merchant marketplace, item sales platform and/or application, and/or a checkout application and payment processing flow utilizing payment and electronic transaction processing services provided by service provider server 130. Merchant webpage 122 may be used to establish a transaction once a user/employee associated with merchant server 120 has entered one or more items for purchase and/or entered the item(s) to the transaction for processing. Once a payment amount is determined for the item(s) to be purchased by the user, merchant server 120 may request payment for the transaction. Payment may be provided using a digital account, as well as through entry of payment and/or financial instrument information, user information, and the like. In this regard, payment may be received from a digital account and/or payment instrument through payment processing by service provider server 130. After receipt of payment information, merchant server 120 may then process a payment to the merchant associated with merchant server 120 using the services provided by service provider server 130.

For example, merchant webpage 122 may include a webpage element 123 that may be implemented, injected, and/or provided with webpages of merchant webpage 122 using an SDK and corresponding code, code snippets or packages, instructions, and the like provided by the SDK from service provider server 130. The SDK may further include API configurations and specifications to make and exchange API calls, as well as setup APIs of merchant server 120 and/or merchant webpage 122 to execute calls and receive/respond to received calls, such as those that may be performed through a Fetch-like API provided by service provider server 130 for use with an iframe-based proxy or other element. In this regard, webpage element 123 may correspond to such proxy, which may be established on and with merchant webpage 122 and may request webpage data and/or other digital content from service provider server 130. This may be done by executing a Fetch based request and API call to an API of service provider server 130 for data 124, with such request, an access token 127 from database 126 may be provided, which may be used to authorize particular URLs and/or other network addresses authorized for loading of data 124 and/or use of webpage element 123 to load data 124 or other data. Service provider server 130 may determine if data 124 is authorized to be loaded based on access token 127 in webpage element 123 for a URL or other network address for merchant webpage 122, and may then provide data 124 in response to such determination using the Fetch-like API.

Merchant server 120 may further include database 126 which may include, for example, identifiers associated with merchant webpage 122 and/or other applications, identifiers associated with hardware of merchant server 120, or other appropriate identifiers. Database 126 may receive and store data from user device 110, such as in response to receiving transaction data and/or payment data. Database 126 may therefore further store and use access token 127, which may be used to authorize loading of webpage data or other digital content in an iframe-based or other proxy corresponding to webpage element 123 on merchant webpage 122.

Merchant server 120 includes at least one network interface component 128 adapted to communicate with user device 110, service provider server 130, and/or other devices or servers over network 150. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for electronic transaction processing services discussed herein. Various embodiments of the system described herein may be provided by service provider server 130 and may be accessible by user device 110 and/or merchant server 120 when providing webpage data and other digital content and computing services via one or more proxies implemented with merchant server 120 for an endpoint of service provider server 130. In such embodiments, service provider server 130 may interface with user device 110 for monitoring websites and providing electronic transaction processing services when webpages of merchant website 114 are accessed and loaded with corresponding proxies. Service provider server 130 includes one or more processing applications which may be configured to interact with user device 110 and merchant server 120. In one example, service provider server 130 may be provided by PAYPAL®. However, in other embodiments, service provider server 130 may be maintained by or include another type of service provider.

Service provider server 130 of FIG. 1 includes a webpage portal platform 140, service applications 132, a database 134, and a network interface component 138. Webpage portal platform 140 and service applications 132 may correspond to executable processes, procedures, and/or applications with associated hardware. In other embodiments, service provider server 130 may include additional or different modules having specialized hardware and/or software as required.

Webpage portal platform 140 may correspond to one or more processes to execute modules and associated specialized hardware of service provider server 130 to provide data, operations, and processes to monitor user device 110's interactions with merchant server 120 and provide electronic transaction processing services used by user device 110 with merchant website 114 hosted and/or provided by merchant server 120. In this regard, webpage portal platform 140 may correspond to specialized hardware and/or software used by a user associated with user device 110 to establish an account with webpage portal platform 140 and/or access another account with service provider server 130. For example, an account provided by PAYPAL® may be provided by service provider server 130 via webpage portal platform 140 and/or service applications 132. However, a more general account (e.g., a communication, payment, or other service account) may also provide account services and be utilized when interacting with webpage data and other digital content provided through iframe-based proxies and other webpage elements having proxies to provide data from endpoints of service provider server 130 (e.g., endpoints associated with service applications 132). Webpage portal platform 140 may correspond to a product of service provider server 130 that may be utilized by merchants to enable electronic transaction processing services of service provider server 130, as well as other computing services, on and/or with websites and applications of the merchants, such as on merchant website 114 for the merchant corresponding to merchant server 120. Webpage portal platform 140 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Webpage portal platform 140 may include one or more APIs that perform API calls and requests, and receive responses, in order to perform website monitoring and saving offer services.

For example, webpage portal platform 140 may provide or be associated with an SDK and may include a Fetch-like API to exchange API calls with merchant website 114. In this regard, the SDK may be provided and/or accessible to configure APIs, HTML or CSS code and data, websites, applications, and the like to interact with webpage portal platform 140. As such, the SDK may be provided to merchant server 120 and/or to the merchant corresponding to merchant server 120, which may utilize the SDK with merchant website 114 to establish webpage element 123 and access token 127 that verifies the URLs and/or other network addresses that are legitimate, valid, and provided permissions for the merchant. Webpage element 123 may therefore correspond to a proxy that is created, established, and/or injected in computing code and/or webpage files for merchant website 114. As such, the SDK may be used to create webpage portals 142 with merchant website 114 and other websites, which may then establish webpage elements 144 for the different iframes, proxies, and the like on the websites and create, validate, and store access tokens 146 for the different websites and their permissions 147 for legitimate URLs and other network addresses that may load data from endpoints of service provider server 130 in corresponding ones of webpage elements 144.

Thereafter, users may interact with websites via their computing devices, such as user device 110 using browser application 112 to navigate to, load, and interact with merchant website 114. When doing so, the websites may wish to load and serve data from internal endpoints for computing services of service provider server 130, such as to provide processes and features for electronic transaction processing, account login, and the like of service provider server 130 on external third-party websites of the merchants. Requests may be received for webpage elements 144 established on those external third-party websites to the Fetch-like API of service provider server 130. For example, a request may include a GET command, one of access tokens 146, a URL or network address, and the like, which may request for the endpoint to load webpage data or other digital content through a corresponding one of webpage elements 144 on the third-party website.

To prevent fraudsters from attempting to load data from endpoints of service provider server 130 and engage in fraud through the computing services of service provider server 130, or initiate computing attacks against such endpoints and services, permissions 147 for access token 146 may be referenced when requests are received. Decisions 148 on data loading, such as whether to provide data 124 through webpage element 123 may be determined based on permissions 147 and the corresponding network address for the request. Decisions 148 may therefore allow data loading and serving on external third-part websites through webpage elements 144, may prevent data loading, and/or may flag requests as malicious or fraudulent based on permissions 147 and the received corresponding token of access token 146 with the network address for the request. The operations and components of webpage portal platform 140 that interact with merchant server 120 for authorizing endpoint data requests and providing data from endpoints of service provider server via merchant website 114 are discussed in further detail with regard to FIGS. 2-4B below.

Service applications 132 may correspond to one or more processes to execute modules and associated specialized hardware of service provider server 130 to process a transaction or provide another service to customers or end users of service provider server 130. In some embodiments, service applications 132 may be used by a user associated with user device 110 to establish a payment account and/or digital wallet, which may be used to process transactions. In various embodiments, financial information may be stored to the account, such as account/card numbers and information. A digital token for the account/wallet may be used to send and process payments, for example, through an interface provided by service provider server 130. The payment account may be accessed and/or used through a web browser application/extension and/or dedicated payment application executed by user device 110 and engage in transaction processing through service applications 132. Service applications 132 may process the payment and may provide a transaction history to user device 110 for transaction authorization, approval, or denial. However, in other embodiments, service applications 132 may instead provide different computing services, including social networking, microblogging, media sharing, messaging, business and consumer platforms, etc.

Service applications 132 as may provide additional features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including one or more GUIs and the like, configured to provide an interface to the user when accessing service provider server 130, where the user or other users may interact with the GUI to more easily view and communicate information. In various embodiments, service applications 132 may include additional connection and/or communication applications, which may be utilized to communicate information to over network 150.

Additionally, service provider server 130 includes database 134. Database 134 may store various identifiers associated with user device 110. Database 134 may also store account data, including payment instruments and authentication credentials, as well as transaction processing histories and data for processed transactions. Database 134 may store data associated with SDK usage, enrollment in portal usage of proxies on third-party websites, access tokens 146, and/or permissions 147, such as merchant enrollment data that may include the aforementioned information in data tables for lookup.

In various embodiments, service provider server 130 includes at least one network interface component 138 adapted to communicate user device 110, merchant server 120, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
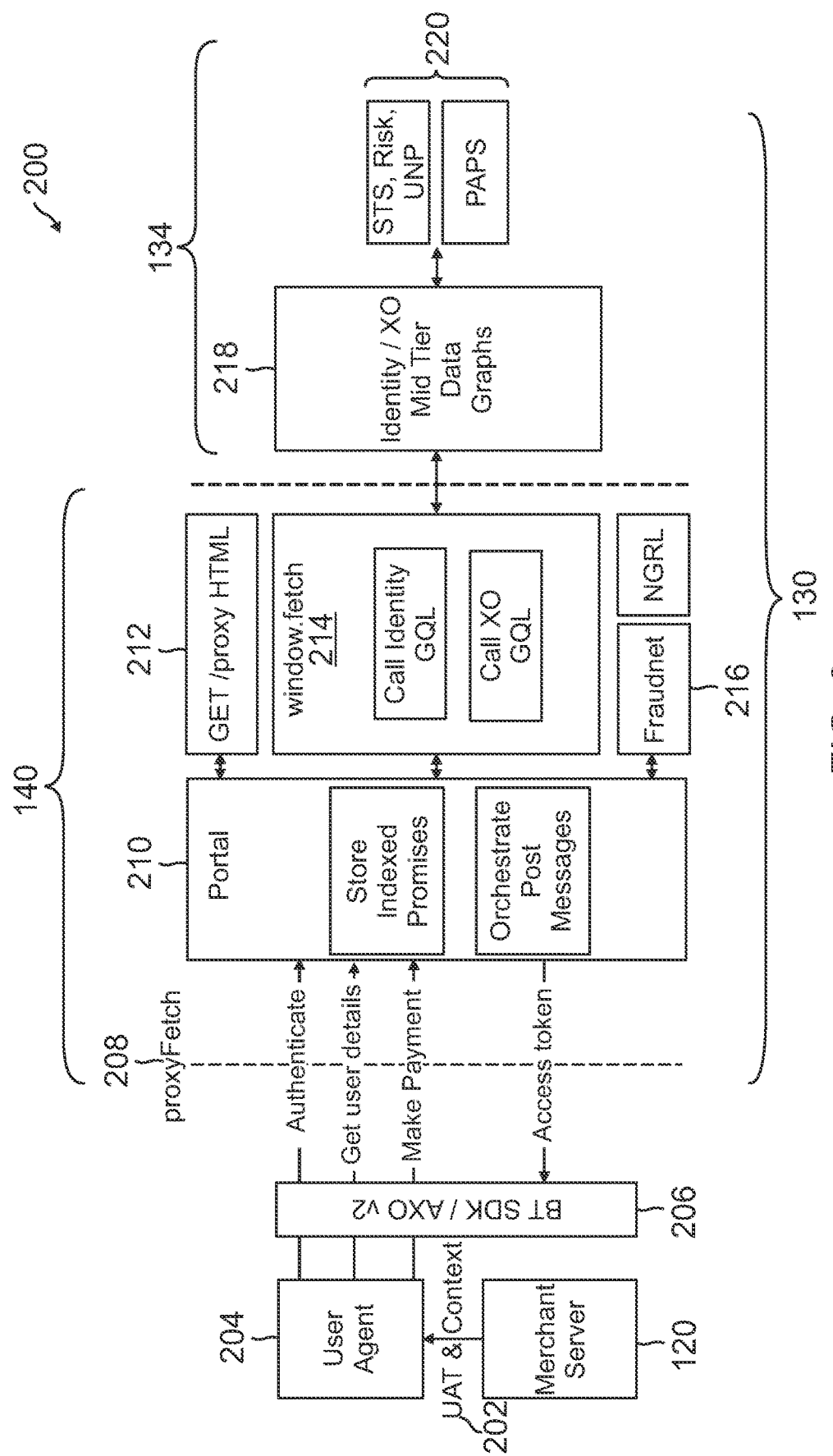
FIG. 2 is exemplary system architecture diagram of a service provider that provides, manages, and utilizes dynamic security policies through the use of webpage element proxies on external third-party webpages, according to an embodiment.

FIG. 2 is exemplary system architecture diagram 200 of a service provider that provides, manages, and utilizes dynamic security policies through the use of webpage element proxies on external third-party webpages, according to an embodiment. Diagram 200 includes operations that may be performed by a service provider when interacting with a merchant website to provide data through a proxy on the merchant website to a user's computing device, such as those performed by service provider server 130 when interacting with merchant website 114 discussed in reference to system 100 of FIG. 1.

In diagram 200, service provider server 130 may include components for providing iframe-based proxy usage with webpage data loading on external third-party websites and the like. In this regard, the components in diagram 200 are shown to include webpage portal platform 140 that may serve as a frontend platform to interface with external components of merchant server 120, as well as service applications 132 acting as endpoints that provide data that may be served to merchant server 120 through webpage portal platform 140. For example, merchant server 120 may onboard a website to utilize an iframe or other proxy to serve the data from service applications 132 using webpage portal platform 140 acting as a portal to serve data through these proxies on external third-party websites and applications. For example, when a user accesses a webpage of a website hosted and/or managed by merchant server 120, a proxy may be included with the webpage to serve webpage data or other digital content from service provider server 130 through the webpage, and an access token and context 202 may be provided and processed by a user agent application 204 of the merchant's computing system that interfaces with merchant server 120. User agent application 204 may utilize access token and context 202 to authenticate and/or validate the webpages capabilities to provide the data from service provider server 130 though the iframe or other proxy using an SDK 206 that implements the functionalities for proxy-based data loading on the webpage.

In this regard, SDK 206 utilizes a Fetch-like API call proxyFetch 208 to execute Fetch-like calls with one or more APIs of service provider server 130. For example, SDK 206 may be used to implement functionalities for proxyFetch 208, or other proxy fetch and fetch-like commands and operations, to make calls to authenticate, obtain user details or information, and/or make a payment with a portal API 210 of service provider server 130. These functionalities may be requested using GET calls or requests to portal API 210 using the code or computing functionalities implemented using SDK 206. Portal API 210 may interface with additional components and applications of webpage portal platform 140, such as a GET request handler 212, a call identity handler 214, and fraud detection components 216. Webpage portal platform 140 may also interact with a backend of service provider server 130, which may perform particular data processing tasks to validate merchant websites and/or other data requestors for data loading and serving through iframe-based proxies and the like. For example, an identity service 218 for confirming permissions associated with URLs and other network addresses may interact with risk components 220 to validate and/or provide data loading through webpage elements, iframe-based proxies, and the like.

Figure 3:
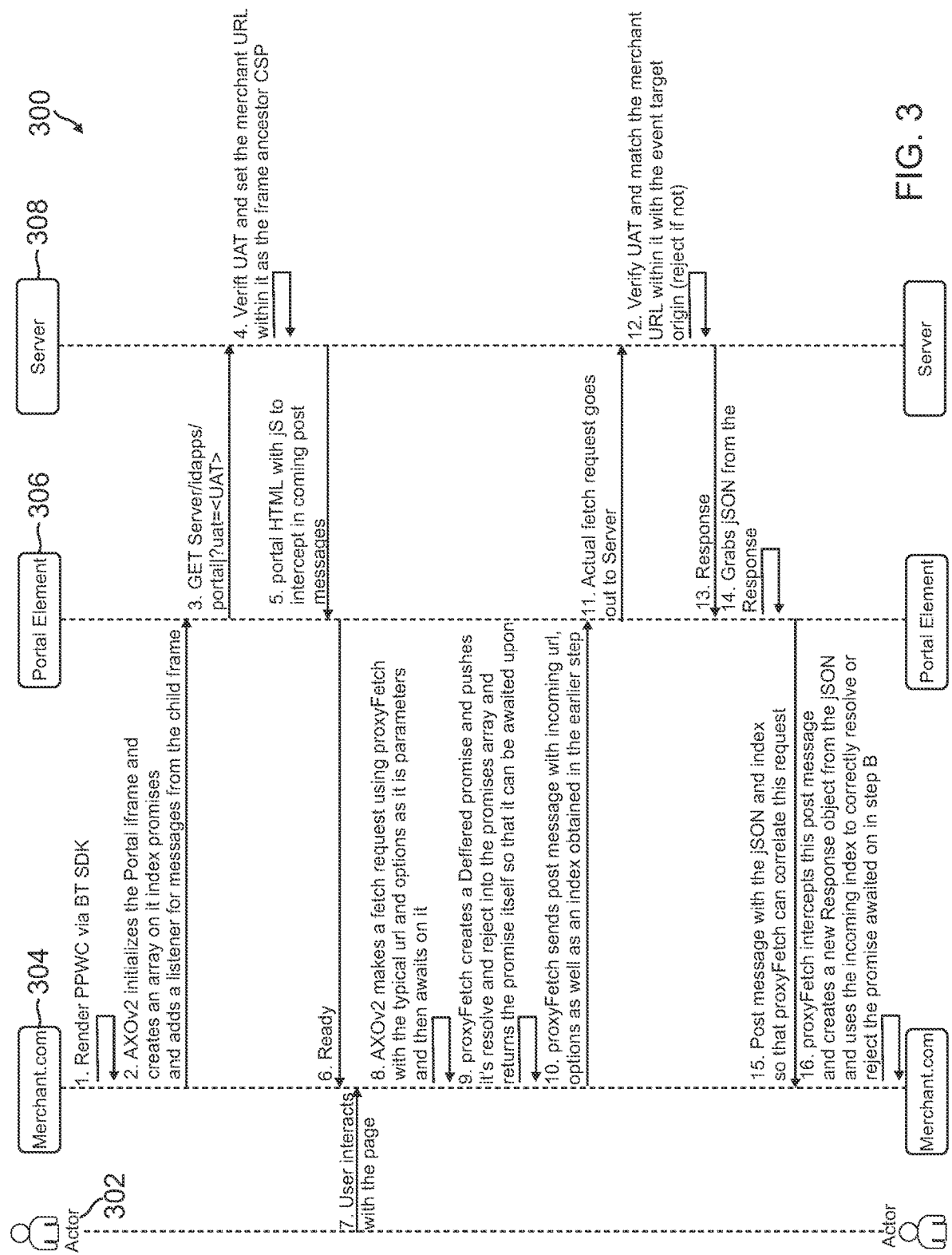
FIG. 3 is an exemplary diagram of operations and exchanged calls between websites, applications, and corresponding systems when establishing, managing, and utilizing dynamic content security policies through the use of webpage element proxies on external third-party webpages, according to an embodiment.

FIG. 3 is an exemplary diagram 300 of operations and exchanged calls between websites, applications, and corresponding systems when establishing, managing, and utilizing dynamic content security policies through the use of webpage element proxies on external third-party webpages, according to an embodiment. In diagram 300, exemplary calls exchanged between components, devices, and/or servers of an actor 302, a merchant website and/or servers for a merchant URL 304 or other network address hosting a merchant platform, a webpage element 306, such as an iframe-based proxy, and a server 308 of a service provider are shown interacting. As such, the components, devices, and/or servers may correspond to user device 110, merchant server 120, and/or service provider server 130 from system 100 of FIG. 1.

Prior to actor 302 interacting with merchant URL 304, such as by navigating to merchant URL 304 and loading webpages of a corresponding merchant website, the merchant corresponding to merchant URL 304 may initiate interactions with server 308 to establish webpage element 306 on the merchant website, such as with the webpages for electronic transaction processing. At an interaction 1, SDK components may be rendered via an SDK of the service provider, such as by accessing and utilizing the SDK to view, load, and/or utilize code, code packages, instructions, API specifications, and the like. Such SDK components may be used for configuring a merchant website and corresponding HTML code for insertion, injection of, and/or incorporation of webpage element 306 on the merchant webpage. At an interaction 2 to setup webpage element 306 with the merchant website and/or corresponding webpages for data loading from the service provider's endpoints, a portal iframe or other iframe-based proxy may be initialized with the merchant website for merchant URL 304 with webpage element 306. This may cause an array to be created that includes an index for promises associated with Fetch-like commands (e.g., deferred promises for execution of a task and corresponding success or failure). A listener may also be added to listen for messages on the merchant website from the child iframe or other proxy incorporated as webpage element 306.

At an interaction 3, webpage element 306 may execute a GET call to server 308 to a network address. The GET call may be for a UAT or other access token, which may be used to uniquely identify the merchant and/or merchant website and validate one or more websites and/or network addresses for loading of webpage data or other digital content from server 308. At an interaction 4, server 308 may verify the UAT and set the merchant URL within the UAT as the iframe ancestor (e.g., originator and related to the UAT). Server 308 returns a response to webpage element 306 at an interaction 5 with an instruction to intercept incoming post messages, which may be used for processing Fetch-like commands. Thus, at an interaction 6, webpage element 306 signals to the merchant website and/or servers for merchant URL 304 that it is ready.

Thereafter, at an interaction 7, actor 302 interacts with a webpage of merchant URL 304 that includes the iframe or other proxy to load a webpage (e.g., a payment webpage) from server 308 and/or otherwise serve digital content from server 308 based on a dynamic CSP enforced through the UAT. As such, as an interaction 8, the server(s) for merchant URL 304 makes a fetch request using the proxy fetch or "proxyFetch" commands and API specification (e.g., for the Fetch-like API utilized and/or provided by server 308 with webpage element 306). The fetch request may be made or generated with standard or typical parameters and options for a fetch command, and at an interaction 9, for the proxyFetch, a deferred promise object may be created and pushed to resolve and/or reject into the promise array created for webpage element 306. This allows the promise object to be returned and awaited to be acted on depending on the success or failure of the call (e.g., based on establishing a trust relationship for data loading using the UAT). At an interaction 10, merchant URL 304 then uses proxyFetch to send a post message using the webpage element having merchant URL 304, options, and the like from the previous interactions. For example, the postMessage method may only be capable of returning undefined, and therefore to adhere to a fetch like behavior, the fetchProxy creates the deferred promise object that has a derived resolve injected to the promise array stored on the iframe object for webpage element 306.

At an interaction 11, webpage element 306 may execute the fetch request to server 308, which requests webpage data for loading a webpage via merchant URL 304 on the corresponding website. The webpage element 306 may perform the actual fetch and responds back with a JSON Response along with its associated index via a postMessage to a listener for this specific post message. Once this happens, the fetchProxy uses the incoming JSON response to create a new Response object used with the index to resolve/reject the promise object being awaited. At an interaction 12, to prevent fraud, the UAT is used by server 308 to verify access and match merchant URL 304 to permissions with and/or included with the UAT. This allows for verifying the event target origin, and at an interaction 13, server 308 returns a promise object to webpage element 306, which may include the webpage element for loading. Webpage element 306 may obtain the JSON response and/or container from the response at an interaction 14. At an interaction 15, the post message with the JSON Response and/or container may be provided to merchant URL 304 and/or corresponding servers, so that the proxyFetch API may correlate the message with the request. Thus, as an interaction 16, the proxyFetch API intercepts the post message and creates a new Response object from the JSON Response and/or container. This may allow the index to correctly resolve or reject the promise object being awaited and determine data to provide actor 302 in webpage element 306 on the accessed webpage of the merchant's website for merchant URL 304.

Figure 4A:
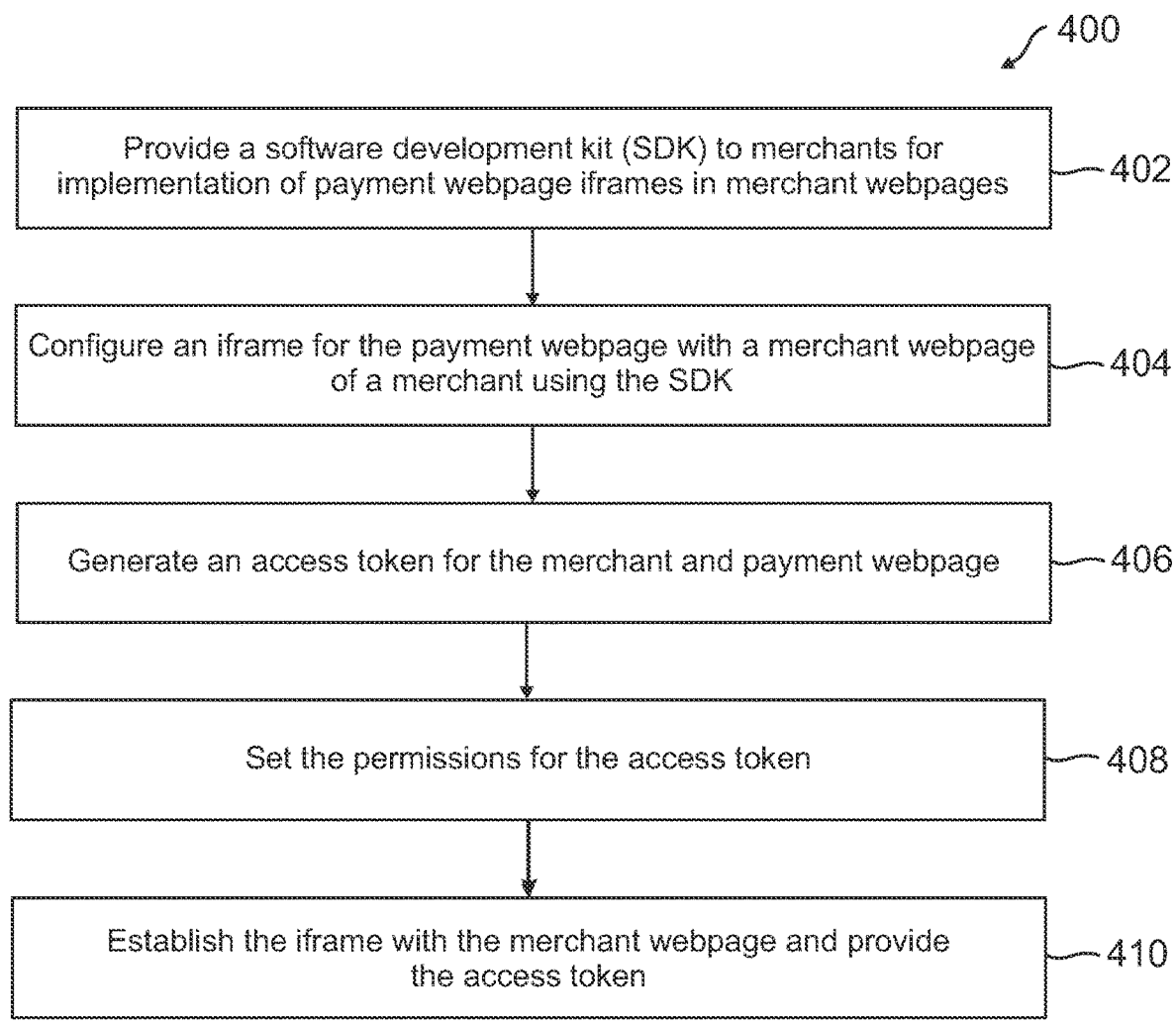
FIGS. 4A-4B are flowcharts for processes utilized to provide and manage dynamic content security policies using webpage data loaded in webpage element proxies, according to an embodiment.
Figure 4B:
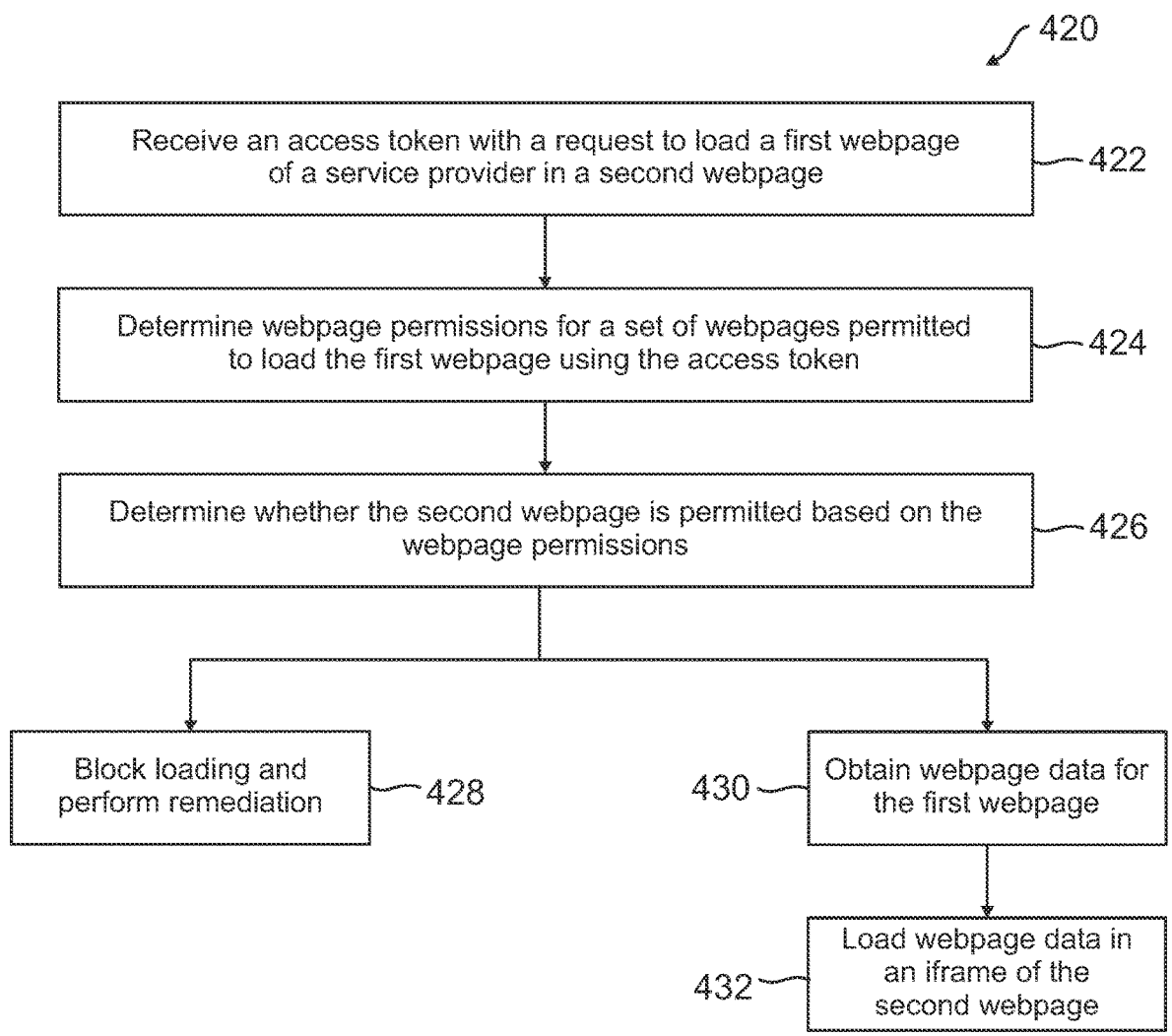

FIGS. 4A-4B are flowcharts for processes utilized to provide and manage dynamic content security policies using webpage data loaded in webpage element proxies, according to an embodiment. FIG. 4A is a flowchart 400 for processes performed to establish an access token and implement an iframe-based proxy on an external third-party website, such as one of a merchant, according to an embodiment. Note that one or more steps, processes, and methods described herein of flowchart 400 may be omitted, performed in a different sequence, or combined as desired or appropriate.

At step 402 of flowchart 400, an SDK is provided to a merchant for implementation of payment webpage iframes in merchant webpages. A service provider may make an SDK available via one or more online resources, such as a website and/or software repository for the service provider. The SDK may include API specifications, code package and/or snippets, processes and executable operations, instructions, and the like that may be utilized by merchants to implement functionalities provided by the SDK in merchant websites and/or with merchant applications. In this regard, the SDK may include functionalities to implement webpage elements that serve as proxies to provide, load, and serve data from an endpoint of the service provider on an external and/or third-party website or application of another entity, such as a merchant. Such data may correspond to electronic transaction processing services and/or other digital content.

At step 404, an iframe for the payment webpage is configured with a merchant webpage of a merchant using the SDK. The iframe may correspond to the proxy implemented using the SDK in the merchant website that may load and provide webpage data, such as a payment webpage for electronic transaction processing and/or account login with the service provider, but may be served and provided on the third-party merchant website that is external and therefore may introduce risk. The proxy may be iframe-based or may be based on and/or utilize other webpage elements that may load data on one online platform from another online platform, such as data streaming channels and outputs and the like.

At step 406, an access token for the merchant and payment webpage is generated. The access token may be generated in order to protect data loading and iframe or other proxy usage, such as where a malicious party may utilize an iframe to attempt to host and provide the service provider's data on a website or other online platform of the malicious party. Such activity may be performed by replaying, spoofing, or otherwise imitating calls made by the merchant, but with fraudulent activity. An access token may be generated as a UAT uniquely identifying the merchant.

At step 408, the permissions are set for the access token. To prevent the aforementioned fraud, the access token may be generated as a UAT that includes permissions for designated secure or trusted URLs, webpages, or other network addresses. Thus, when the request is received from an online endpoint having the iframe or other proxy, the access token may be used to validate that the endpoint requesting the data is valid. This allows for a CSP to be established that is dynamic for the merchant and access token.

At step 410, the iframe is established with the merchant webpage for the access token. The iframe may be established, added to, injected, and/or utilized with one or more webpages of the website that may be loaded in the web browser application. Establishing the iframe may include embedding an HTML document or other code of the iframe to the webpage(s) of the merchant. The iframe may allow for another call to be executed to another domain hosted by the service provider's servers and may retrieve webpage data and the like from such servers, databases, and/or other online resources. The iframe may return data and a response to the call, which may correspond to the data from the server loaded based on the accessed domain in the iframe.

FIG. 4B is a flowchart 420 for processes utilized to load, provide, and/or serve webpage data and/or other digital content from an endpoint of a service provider via an iframe-based proxy on an external third-party website. Note that one or more steps, processes, and methods described herein of flowchart 420 may be omitted, performed in a different sequence, or combined as desired or appropriate.

At step 422, an access token with a request to load a first webpage of a service provider in a second webpage is received. When a user navigates to a website, such as a merchant website to purchase goods, the website may have an iframe embedded and/or included in one or more webpages, such as the second webpage. The iframe may load the first webpage, such as a payment webpage hosted by the service provider. As such, the iframe may request permission to connect with an endpoint of the service provider and load data.

At step 424, webpage permissions for a set of webpages permitted to load the first webpage are determined using the access token. With the access token, a set of established permissions may be set with a CSP that is dynamic such that allowed and trusted URLs and other network addresses may be designated for requests using a UAT or other access token. As such, when requests are received, access tokens may be required to verify the requests, and further those access tokens may be matched to allowable network addresses for use of those access tokens to request data loading.

At step 426, it is determined whether the second webpage is permitted based on the webpage permissions. A lookup may be performed to determine if the requestor of the loading of the first webpage is an ancestor for the CSP and access token and/or has been validated for trust and/or use of the access token. This may include a database lookup for the access token and granted permissions or trust for the dynamic CSP corresponding to that access token. If not permitted, at step 428, loading is blocked, and a remediation is performed. The remediation may include remedial actions, such as blocking the requestor and/or adding to a blacklist, notifying the valid merchant and/or entity for the access token, and/or reissuing the access token. Other remedial actions may include those actions that may be used to prevent loading of webpage data for the first webpage on the second webpage, remedial actions for removal of or ending of a communication channel with the iframe or other proxy, and/or remedial actions for generating alerts and/or notifications for the unauthorized use or request.

However, if permitted, at step 430, webpage data for the first webpage is obtained. The permission may be verified by matching the requestor to the valid requester and permitted network addresses or online platforms to load the data. Thus, at step 432, webpage data is loaded in an iframe of the second webpage. The webpage data may be loaded to a Fetch-like call and processing by providing a response to the iframe and allowing the iframe to obtain the data container for the first webpage (e.g., a JSON object), which may be provided to the merchant website for loading with the iframe or other proxy.

Figure 5:
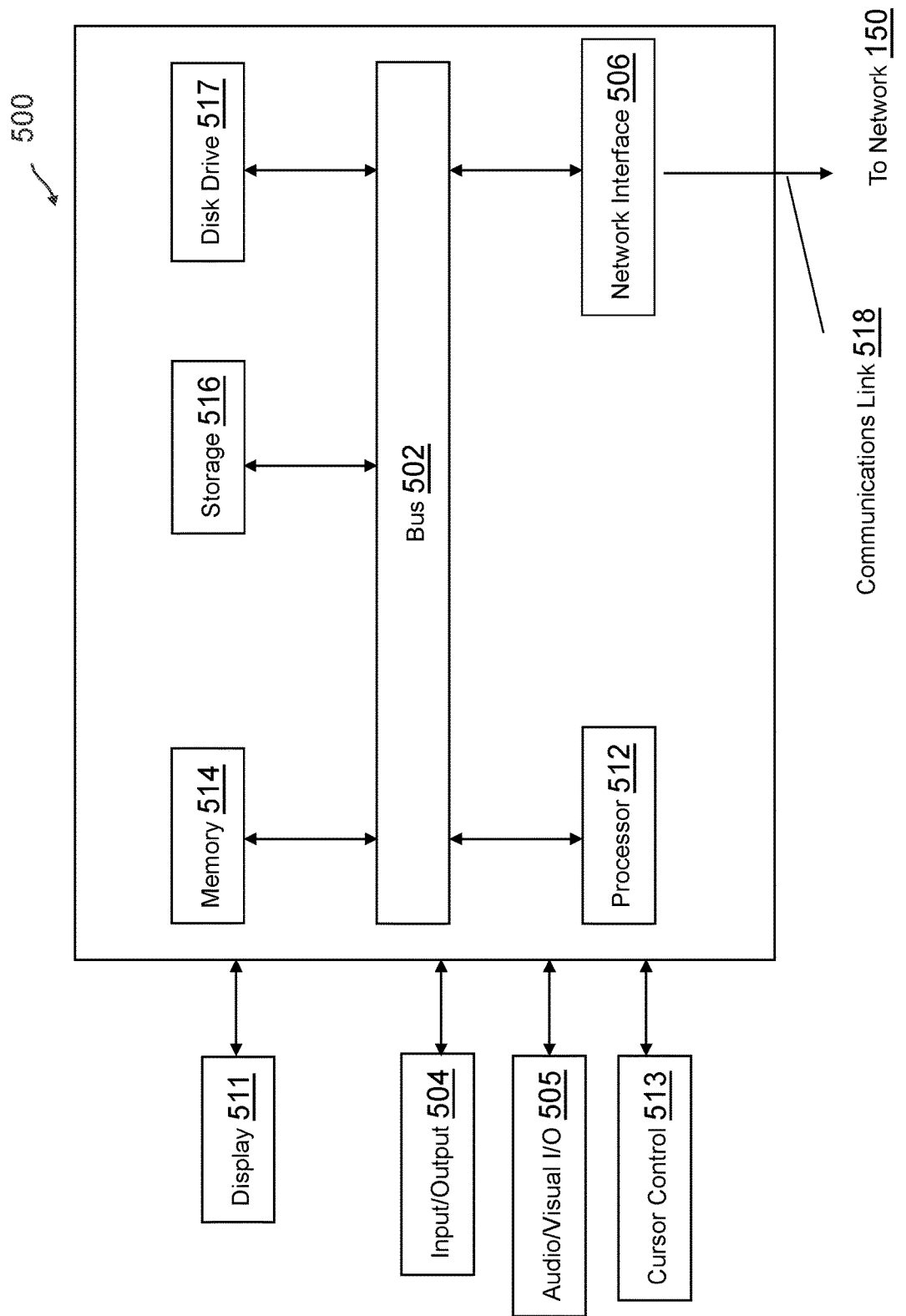
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on iframes, mobile web browsers, and webpages, other types of injectable coded data, applications, and sources are also within the scope of various embodiments of the present disclosure. Thus, the present disclosure is limited only by the claims.

What is claimed is:

1. A system comprising:
 a non-transitory memory; and
 one or more hardware processors coupled to the non-transitory memory and configured to read instructions from the non-transitory memory to cause the system to perform operations:
  receiving a request from an iframe-based proxy on a first webpage to load a second webpage associated with the system in the iframe-based proxy on the first webpage, wherein the request is received in association with an access token;
  validating the access token based on permissions established with the access token and an identity of the first webpage;
  determining, based on the access token, allowed websites associated with the access token, wherein the allowed websites are authorized to load the second webpage in corresponding webpage element proxies;
  determining whether an address of the first webpage is one of the allowed websites; and
  determining whether to load the second webpage in the iframe-based proxy based on the validating the access token and the determining whether the address of the first webpage is one of the allowed websites; and
  executing an action with the iframe-based proxy response to the determining whether to load the second webpage in the iframe-based proxy.

2. The system of claim 1, wherein, prior to receiving the request, the operations further comprise:
 determining that the iframe-based proxy with an application programming interface (API) has been implemented in the first webpage, wherein the iframe-based proxy enables execution of proxy fetch commands for the request to the system after being implemented in the first webpage; and
 associating the proxy fetch commands with the iframe-based proxy.

3. The system of claim 2, wherein the proxy fetch commands include a deferred promise processed with the API and a post message with an incoming uniform resource locator for the address of the first webpage.

4. The system of claim 2, wherein the operations further comprise:
 transmitting, to the API, a post message response with an object container associated with the second webpage, wherein the proxy fetch commands include a response object creation associated with the object container.

5. The system of claim 2, wherein the iframe-based proxy with the API is implemented using a software development kit (SDK) associated with the system for a plurality of merchant webpages including the first webpage.

6. The system of claim 1, wherein the request is based on a proxy fetch request by the first webpage with the second webpage using the iframe-based proxy and a proxy fetch API implemented with the first webpage for the iframe-based proxy, and wherein the request is received as a fetch request for a fetch API of the system.

7. The system of claim 1, wherein the iframe-based proxy fetches the access token in response to a user navigating to and loading the first webpage on a user device, and wherein the receiving the request comprises receiving a GET call for the second webpage with the fetched access token from the iframe-based proxy.

8. The system of claim 1, wherein the access token is associated with a content security policy that is dynamic based on the permissions set with the access token, wherein the permissions include access to the allowed websites, and wherein the operations further comprise:
  receiving a new set of allowed websites for the permissions; and
  updating the allowed websites for the permissions based on the new set of allowed websites.

9. The system of claim 1, wherein the operations further comprise:
  in response to determining to load the second webpage in the iframe-based proxy on the first webpage, causing the iframe-based proxy to load the second webpage using a data container associated with the second webpage.

10. The system of claim 1, wherein the determining whether to load the second webpage in the iframe-based proxy comprises determining that the address of the first webpage does not match one of the allowed websites for the access token, and wherein the executing the action comprises:
  preventing the second webpage from loading in the iframe-based proxy; and
  executing a remedial action with at least one of the first webpage, the access token, or an entity associated with one of the first webpage or the access token.

11. A method comprising:
  receiving a request from an iframe-based proxy on a first webpage to load a second webpage in the iframe-based proxy on the first webpage, wherein the request is received in association with an access token;
  validating the access token based on permissions established with the access token and an identity of the first webpage;
  determining, based on the access token, allowed websites associated with the access token, wherein the allowed websites are authorized to load the second webpage in corresponding webpage element proxies;
  determining whether an address of the first webpage is one of the allowed websites; and
  determining whether to load the second webpage in the iframe-based proxy based on the validating the access token and the determining whether the address of the first webpage is one of the allowed websites; and
  executing an action with the iframe-based proxy response to the determining whether to load the second webpage in the iframe-based proxy.

12. The method of claim 11, wherein, prior to receiving the request, the method further comprises:
  determining that the iframe-based proxy with an application programming interface (API has been implemented in the first webpage, wherein the iframe-based proxy enables execution of proxy fetch commands for the request after being implemented in the first webpage; and
  associating the proxy fetch commands with the iframe-based proxy.

13. The method of claim 12, wherein the proxy fetch commands include a deferred promise processed with the API and a post message with an incoming uniform resource locator for the address of the first webpage.

14. The method of claim 12, further comprising:
  transmitting, to the API, a post message response with an object container associated with the second webpage, wherein the proxy fetch commands include a response object creation associated with the object container.

15. The method of claim 12, wherein the iframe-based proxy with the API is implemented using a software development kit (SDK) for a plurality of merchant webpages including the first webpage.

16. The method of claim 11, wherein the request is based on a proxy fetch request by the first webpage with the second webpage using the iframe-based proxy and a proxy fetch API implemented with the first webpage for the iframe-based proxy, and wherein the request is received as a fetch request for a fetch API.

17. The method of claim 11, wherein the iframe-based proxy fetches the access token in response to a user navigating to and loading the first webpage on a user device, and wherein the receiving the request comprises receiving a GET call for the second webpage with the fetched access token from the iframe-based proxy.

18. The method of claim 11, wherein the access token is associated with a content security policy that is dynamic based on the permissions set with the access token, wherein the permissions include access to the allowed websites, and wherein the method further comprises:
  receiving a new set of allowed websites for the permissions; and
  updating the allowed websites for the permissions based on the new set of allowed websites.

19. The method of claim 11, further comprising:
  in response to determining to load the second webpage in the iframe-based proxy on the first webpage, causing the iframe-based proxy to load the second webpage using a data container associated with the second webpage.

20. A non-transitory machine-readable medium having stored thereon machine-readable instructions executable to cause a machine to perform operations comprising:
  receiving a request from an iframe-based proxy on a first webpage to load a second webpage in the iframe-based proxy on the first webpage, wherein the request is received in association with an access token;
  validating the access token based on permissions established with the access token and an identity of the first webpage;
  determining, based on the access token, allowed websites associated with the access token, wherein the allowed websites are authorized to load the second webpage in corresponding webpage element proxies;
  determining whether an address of the first webpage is one of the allowed websites; and
  determining whether to load the second webpage in the iframe-based proxy based on the validating the access token and the determining whether the address of the first webpage is one of the allowed websites; and
  executing an action with the iframe-based proxy response to the determining whether to load the second webpage in the iframe-based proxy.

* * * * *